Feb. 21, 1956 H. O. HOADLEY 2,735,616
ELECTRONIC MULTIPLIER CIRCUIT
Filed June 19, 1952 2 Sheets-Sheet 1

*Harvey O. Hoadley*
INVENTOR.

BY Daniel J. Mayne
Lee H. Kaiser

ATTORNEYS

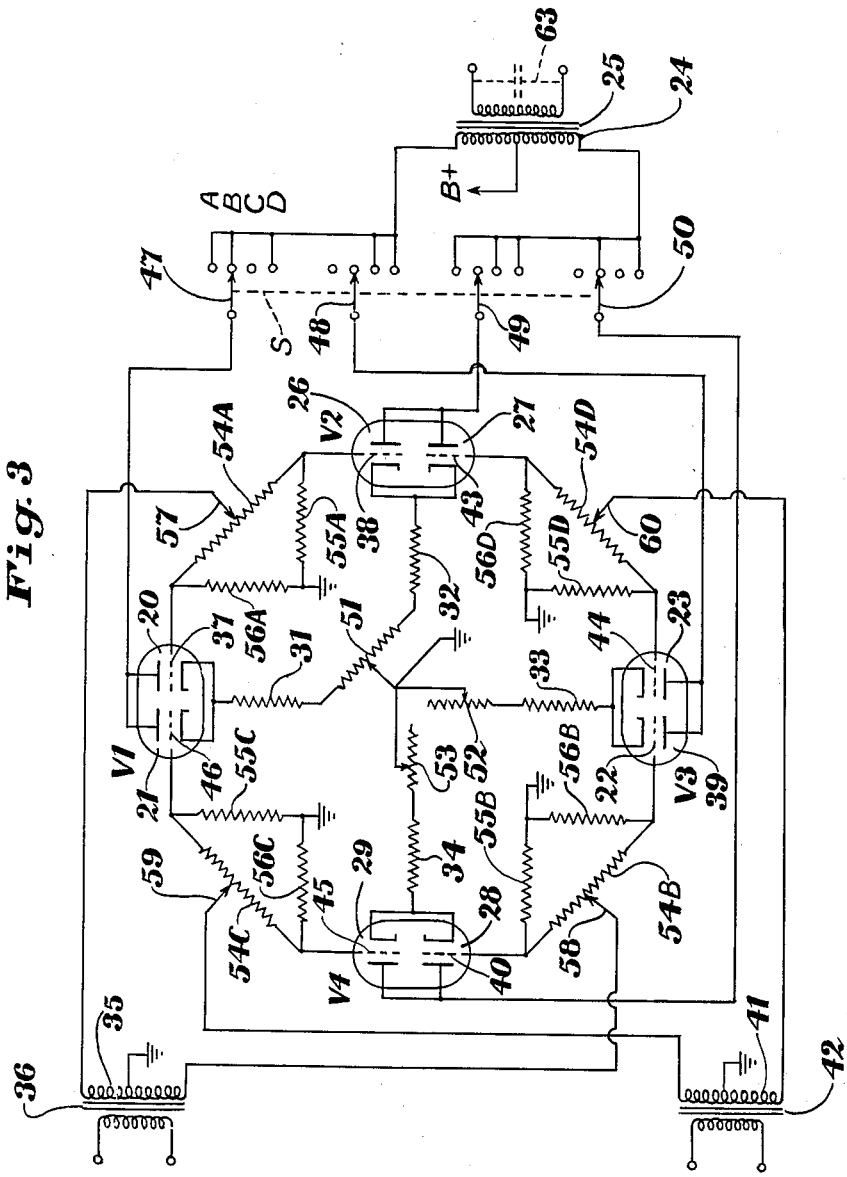

US Patent Office
2,735,616
Patented Feb. 21, 1956

2,735,616

ELECTRONIC MULTIPLIER CIRCUIT

Harvey O. Hoadley, Rochester, N. Y., assignor to Eastman Kodak Company, Rochester, N. Y., a corporation of New Jersey Application June 19, 1952, Serial No. 294,510

5 Claims. (Cl. 235—61)

This invention relates to analog computers, and in particular to electronic circuits for performing a multiplication operation upon two quantities in the form of electrical signals.

The present invention possesses the same advantages over the prior art as the electronic analog multiplier disclosed in my application Serial No. 294,509, filed concurrently herewith in that it is simpler, involves no mechanical motion, is linear over a wide range, and generates an output signal of variable amplitude A. C. form readily suitable for input to a computer for a succeeding arithmetical operation. Also, like the computer of my cofiled application, the present invention is a true analog multiplier in that it derives an output "product" signal which is zero when either of the input signals, i. e., the "multiplicand" or the "multiplier" signal, is zero. The present invention is an improvement over the computer of my cofiled application in that rectification of an A. C. signal is not required, thus eliminating the time constant of a filter circuit and the consequent delay of the unidirectional "multiplier" signal in reaching a steady state value.

It is an object of the invention to provide an improved electronic analog multiplier in which the instantaneous ordinates of the output signal are proportional to the product of the instantaneous ordinates of a multiplicand and a multiplier signal. Still another object is to provide such a multiplier in which it is unnecessary to use matched vacuum tubes having identical characteristics to obtain an output signal which is linearly proportional to the product of two applied signals.

Like the analog computer of my cofiled application, the present invention utilizes a well-known amplifier circuit comprising a pair of electron discharge tubes having commoned anodes and a common unbypassed cathode resistance. The gain of the pair of tubes relative to a signal impressed on the grid of one is a function of the potential of the grid of the other. The preferred embodiment of the invention utilizes four such pairs of triodes with the anodes of the first and third pairs commoned and connected to one side of a push-pull output transformer and with the anodes of the second and fourth pairs also commoned and connected to the opposite side of the transformer. A first input signal, termed a "multiplicand" signal, is connected in push-pull to the grids of one triode (termed an "amplifier" triode) of the first and third pairs and in push-pull to the grids of one triode (also termed an "amplifier" triode) of the second and fourth pairs. A second input signal, termed a "multiplier" signal, is connected in push-pull to the grids of the other triode (termed a "control" triode) of the second and fourth pairs and in push-pull to the grids of the other triode (also termed a "control" triode) of the first and third pairs but in opposite phase to that applied to the grids of the control triodes of the second and fourth pairs. The amplifier triodes driven in phase by the multiplicand signal are thus connected to opposite ends of the output transformer while the control triodes associated therewith are driven out of phase by the multiplier signal, thus causing the gain of the amplifier triodes to vary in opposite directions as a function of the multiplier signal. The instantaneous ordinates of the output signal are proportional to the product of the instantaneous ordinates of the multiplicand and the multiplier signals.

For a better understanding of the present invention, together with other and further objects thereof, reference is made to the following specification and claims and to the accompanying drawing in which:

Fig. 3 is a circuit diagram similar to Fig. 2 with the addition of means for balancing the circuit to compensate for variations in tube characteristics.

Figure 1:
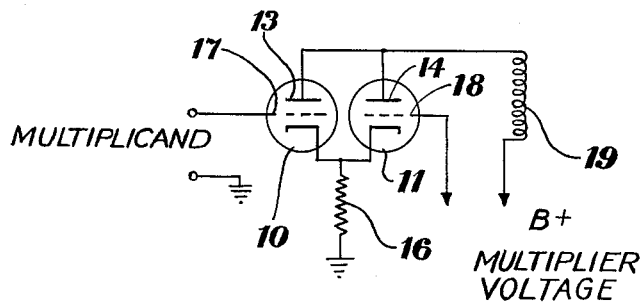
Fig. 1 is a circuit diagram of a prior art amplifier circuit utilized in the invention.

The invention utilizes a well known amplifier circuit illustrated in Fig. 1 comprising an amplifier triode 10 and a control triode 11 having anodes 13 and 14 respectively connected together and a common unbypassed cathode resistor 16 to ground. The gain of the pair of triodes relative to a signal impressed on the grid of one, e. g., an A. C. input signal connected between the grid 17 of the amplifier triode 11 and ground, is over a wide range essentially a linear function of the potential of the grid of the other triode, i. e., the grid 18 of the control triode 11. A source of anode potential for both the amplifier triode 10 and the control triode 11 is connected to one terminal of the primary winding of an output transformer 19.

In the circuit of Fig. 1 the voltage across the load for a constant input signal is varied by changing the plate resistance of the amplifier triode 10 and the effective impedance of the load thereon in opposite directions. The gain of the amplifier tube 10 may be represented by the equation $$\text{Voltage across load} = \frac{-\mu e_s Z_L}{R_P + Z_L}$$

where $\mu$=amplification factor
$e_s$=input signal
$Z_L$=impedance of load
$R_P$=plate resistance The plate current, and thus the plate resistance, of the control triode 11 is a function of the instantaneous potential of the grid 18. With the control triode 11 cut off, a quiescent operating point is determined for the amplifier triode 10. When plate current is allowed to flow through the control triode 11 due to increase of potential on the grid 18, its plate resistance decreases. The flow of control triode plate current through the common cathode resistance 16 increases the grid bias, and thus the plate resistance, of the amplifier triode 10, causing the operating point to drop. The decrease in plate resistance of the control triode 11 causes the effective load on the amplifier triode 10 to decrease. The net result is to reduce the amplification of the amplifier triode 10 as the potential of the grid 18, and thus the plate current of the control triode 11, is increased. It is thus seen that for a constant input signal applied to the grid 17, the voltage across the output transformer is varied by changing the potential of the grid 18. The gain relative to a constant multiplicand signal applied to the grid 17 increases linearly to a good approximation as the potential of the grid 18 goes negative within the limits of saturation and where the grid bias approaches cutoff.

Figure 2:
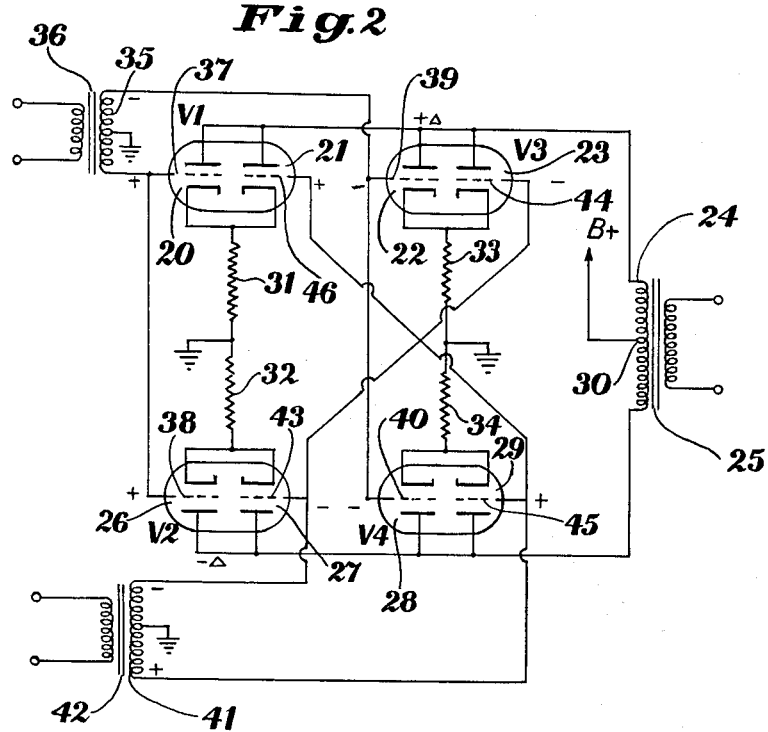
Fig. 2 is a circuit diagram of the preferred embodiment of the invention.

The preferred embodiment of the invention illustrated in Fig. 2 comprises four such triode pairs V1, V2, V3, and V4, of amplifier and control triodes. To obtain an output signal which is linearly proportional to the product of the multiplicand and the multiplier signals it is necessary that the four triodes driven by the same signal, e. g., the four amplifier triodes driven by the multiplicand signal, have similar characteristics. Although the triodes may be single unit tubes, each pair is shown as embodied in a twin triode such as a 6SN7. The anodes of the amplifier triode 20 and the control triode 21 of the first pair V1 and the anodes of the amplifier triode 22 and the control triode 23 of the third pair V3 are connected together and to one end of the primary winding 24 of a push-pull output transformer 25; similarly, the anodes of the amplifier triode 26 and the control triode 27 of the second pair V2 and the anodes of the amplifier triode 28 and the control triode 29 of the fourth pair V4 are connected together and to the opposite end of the primary winding 24. A source of anode potential is connected to the midpoint 30 of the primary winding 24. The cathodes of the amplifier triode 20 and the control triode 21 of the first pair V1 are connected to ground through a common unbypassed resistance 31. Similarly, the cathodes of the amplifier triode and control triode of each of the second, third, and fourth pairs V2, V3, and V4 are commoned and connected to ground respectively through resistances 32, 33, and 34, equal to the resistance 31.

The midpoint of the secondary winding 35 of an input transformer 36 for an A. C. multiplicand signal is grounded. One end of the secondary winding 35 is connected to the grids 37 and 38 of the amplifier triodes 20 and 26 respectively and the opposite end thereof is connected to the grids 39 and 40 of the amplifier triodes 22 and 28 respectively. The midpoint of the secondary winding 41 of an input transformer 42 for an A. C. multiplier signal is connected to ground. One end of the secondary winding 41 is connected to the grids 43 and 44 of the control triodes 27 and 23 respectively and the opposite end thereof is connected to the grids 45 and 46 of the control triodes 29 and 21 respectively.

Although in the preferred embodiment of the invention transformer means are shown to provide inputs balanced to ground, other well known means such as phase inverters may be utilized to provide a push-pull signal from a single-ended input signal.

If an A. C. multiplicand signal is impressed on the primary of the transformer 36 while no multiplier signal is impressed on the primary of the transformer 42, the grids 43, 44, 45, and 46 of all the control triodes are at the same potential. In this condition the first and second pairs V1 and V2 are opposed, and since the grids 37 and 38 of the amplifier triodes 20 and 26 respectively are connected to the same end of the winding 35 and thus in phase, the signals at the anodes of the pairs V1 and V2 cancel in the primary winding 24 and no output signal is generated in the secondary of the transformer 25. In a similar manner with no multiplier signal the gain of the third and fourth pairs V3 and V4 are equal, the grids 39 and 40 of the amplifier triodes 22 and 28 respectively are connected to the same end of the secondary winding 35 and thus in phase, and the signals at the anodes of the opposed pairs V3 and V4 subtract in the primary winding and prevent the generation of an output signal in the secondary of the output transformer 25.

If the multiplicand signal is zero while an A. C. multiplier signal is impressed on the primary of the transformer 42, in a similar manner the first and fourth pairs V1 and V4 are opposed and the second and third pairs V2 and V3 are opposed to prevent the generation of an output signal in the secondary of the transformer 35. With no multiplicand signal the grids 37, 38, 39 and 40 of all the amplifier triodes are at the same potential. The gains of the first and fourth pairs V1 and V4 are thus equal, the grids 46 and 45 of the control triodes 21 and 29 respectively are connected to the same end of the secondary winding 41 and thus in phase, and the signals at the anodes of the first and fourth pairs V1 and V4 subtract in the primary winding 24. With no multiplicand signal the gains of the second and third pairs V2 and V3 are equal, the grids 44 and 43 of the control triodes 23 and 27 respectively are connected to the same end of the secondary winding 41 and thus in phase, and the outputs of the second and third pairs V2 and V3 cancel in the primary winding 24. It is thus seen that a true analog multiplier is disclosed in that the output "product" signal is zero if either the multiplicand or the multipler signal is zero.

The operation of the invention in multiplying a multiplicand signal impressed across the primary of transformer 36 by a multiplier signal impressed across the primary of transformer 42 will be readily understood by assuming an instantaneous condition where the grids 37 and 38 are positive
39 and 40 are negative
43 and 44 are negative, and
45 and 46 are positive as indicated by the "—" and "+" signs in Fig. 2 of the drawing. If the multiplier signal is regarded as the control signal, a positive value of which is instantaneously impressed upon the grid 46 of the control triode 21, it may be considered that the gain of the first triode pair V1 relative to the multiplicand signal is decreased, while the gain of the second triode pair V2 is increased due to the negative value of multiplier signal instantaneously impressed on the grid 43 of control triode 27. The positive multiplicand signal at the grids 37 and 38 of amplifier triodes 20 and 26 is inverted in amplification, and the negative signal at the anodes of the second triode pair V2 is greater by an amount —Δ than the signal at the anodes of the first triode pair V1. At the same time it may be considered that the gain of the third triode pair V3 relative to the multiplicand signal is increased due to the instantaneous negative value of multiplier signal at the grid 44 of control triode 23, while the gain of the fourth triode pair V4 is decreased. The negative signal at the grids 39 and 40 of amplifier triodes 22 and 28 is inverted in amplification, and the positive signal at the anodes of the third triode pair V3 is greater by a similar amount +Δ than the signal at the anodes of the fourth triode pair V4. Since these differences Δ are of opposite sign, they add in the primary winding 24, thereby generating a difference signal in the secondary of the output transformer 25. This difference signal is instantaneously proportional to the multiplicand signal and also proportional to the unbalance created in the circuit by the control signal, which unbalance is in turn instantaneously proportional to the multiplier signal.

Since the circuit is perfectly symmetrical, the same result is obtained if the signal impressed across the primary of the transformer 36 is considered the multiplier signal and the signal impressed across the primary of transformer 42 is considered the multiplicand signal. It is thus apparent that an electronic analog multiplier has been disclosed capable of generating an output signal in which the instantaneous ordinates are proportional to the product of the instantaneous ordinates of the multiplicand and the multiplier signals and is zero when either the multiplicand or multiplier signal is zero.

The linearity of the multiplier of Fig. 2 is dependent upon the similarity of the characteristics of the opposed pairs of triodes. In Fig. 3 the circuit of Fig. 2 is rearranged to show the symmetry of the elements, and like reference numerals are used throughout to indicate identical elements. In addition, Fig. 3 includes means for balancing the circuit in the presence of variations in tube characteristics. This balancing means includes means for individually varying the cathode resistances of the pairs as well as potentiometer means for varying the amplitude of a signal on the grid of one triode relative to the amplitude of the same signal on the triode grid excited in phase therewith. A four pole, four position switch S allows the alternative connection of the opposed triode pairs to opposite sides of the primary winding 24 of the output transformer 25. When the circuit is used as a multiplier, the switch S is in the position marked "D" wherein the switch arms 47 and 48 connect the anodes of the first triode pair V1 and of the third triode pair V3 respectively to one side of the winding 24 and the switch arms 49 and 50 connect the anodes of the second triode pair V2 and of the fourth triode pair V4 respectively to the opposite side of the winding 24. A potentiometer 51 having its adjustable arm grounded connects the cathode resistors 31 and 32. The adjustable arms of potentiometers 52 and 53 connected in series with the cathode resistances 33 and 34 respectively are also connected to ground.

The triode grids upon which in-phase signals are impressed are connected by "triangle" networks each including a potentiometer 54 connecting the two grids and equal resistances 55 and 56 connecting the opposite ends of the potentiometer 54 to ground. A potentiometer 54A connects the grids 37 and 38 of the amplifier triodes 20 and 26 respectively, and equal resistances 55A and 56A to ground are connected to the opposite ends of the potentiometer 54A. Similarly, a potentiometer 54B connects the grids 39 and 40 of the amplifier triodes 22 and 28 respectively, and equal resistances 55B and 56B connect the opposite ends of the potentiometer 54B to ground. The opposite ends of the secondary winding 35 of the input transformer 36 for the multiplicand signal are connected to the adjustable arms 57 and 58 of the potentiometers 54A and 54B respectively. It is apparent that adjustment of the arm of a potentiometer, e. g., arm 57, increases the resistance between the winding 35 and the grid of one amplifier triode, e. g., grid 37 of triode 20, while decreasing the resistance between the winding 35 and the grid of the amplifier triode of the opposed pair, i. e., grid 38 of triode 26, and thus varies the amplitudes of the multiplicand signal at the two grids which are driven in phase. Similarly, the opposite ends of the secondary winding 41 of the input transformer 42 for the multiplier signal are connected to the adjustable arms 59 and 60 of potentiometers 54C and 54D which respectively connect the grids 46 and 45 of the control amplifiers 21 and 29, and the grids 44 and 43 of the control amplifiers 23 and 27. Equal resistances 55C—56C and 55D—56D connect the opposite ends of the potentiometers 54C and 54D respectively to ground, and variation of the amplitudes of the multiplier signal at the control triode grids which are driven in phase is accomplished in exactly the same manner as explained for the multiplicand signal.

In position D the switch S connects the anodes of pairs V1 and V3 to one side of the primary winding 24 and the anodes of pairs V2 and V4 to the opposite side of the primary. The tube pairs V1—V2, V1—V4, and V2—V3 are individually connected to the opposite sides of the primary winding 24 at switch positions A, B, and C respectively. For example, at switch position A the anodes of pair V1 are connected to one side of the primary winding 24 by switch arm 47 and the anodes of pair V2 are connected to the opposite side of the primary by switch arm 49. At this position the output signals from the anodes of the pairs V1 and V2 with zero multiplier signal and with a small amplitude of multiplicand signal applied to the primary of transformer 36, flow in opposite directions in the primary 24 and cancel if the tube characteristics are identical. Any voltage generated in the secondary of output transformer 25 indicates a difference in the characteristics of the amplifier triodes 20 and 26.

In balancing the circuit to compensate for variance in tube characteristics, it is convenient to apply a signal from the same sine wave source to the primary winding of both transformers 36 and 42.

One method of balancing the multiplier circuit to compensate for mismatch of tubes involves positioning the switch S to selectively connect the opopsed tube pairs, e. g., V1 and V2 at position A, to opposite sides of the primary 24, and with one signal input set at zero, e. g., the multiplier signal, and with a small amplitude of signal applied to the other input, i. e., transformer 36, adjust the cathode potentiometer, i. e., 51, to vary the cathode resistances and thus the grid bias of the opposed tube pairs, i. e., V1 and V2. A minimum output from the secondary of the transformer 25 then indicates that opposed tube pairs are at equal gain. Although this procedure is effective to compensate for any mismatch in the tubes at the fundamental frequency of the input signal, the minimum output from the secondary of transformer 25 with this balancing procedure usually contains a spurious signal consisting predominantly of the second harmonic. It was found that this second harmonic is due to difference in the curvature of the characteristics of the two tubes, and to eliminate this spurious signal it is desirable to follow a balancing procedure that involves setting the operating points of the opposed tubes so that the curvatures of the characteristics match, and then adjusting the gains of the tubes to compensate for mismatch at the fundamental frequency by varying the relative amplitudes of the signal applied to in the in-phase grids. The latter operation is conveniently effected by shifting the adjustable arm of the potentiometer connecting the in-phase grids.

The balancing procedure hereinafter described provides the most nearly linear response of the multiplier circuit even with opposed tubes of widely variant characteristics. With zero multiplier signal applied to the primary of transformer 42, and a multiplicand signal applied to the primary of transformer 36, the switch S is set to position A to connect tube pairs V1 and V2 through switch arms 47 and 49 respectively to opposite sides of the primary winding 24 of the output transformer 25. At this position the output signals from the anodes of the pairs V1 and V2 flow in opposite directions in the primary winding 24 and cancel if the tube characteristics are identical. With zero multiplier signal, and a multiplicand signal of small amplitude applied to the primary of transformer 36, any voltage generated in the secondary of output transformer 25 indicates a difference in the characteristics of the amplifier triodes 20 and 26, and the circuit is balanced to compensate for this difference by adjusting potentiometer 51 and potentiometer 54A together to provide minimum output from the secondary of transformer 25. Shifting the adjustable arm of the potentiometer 51 to set the operating points of the opposed amplifier triodes 20 and 26 so the curvatures of the characteristics match balances out the second harmonic spurious signal. Shifting the adjustable arm 57 of the potentiometer 54A varies the relative amplitudes of the multiplicand signal applied in phase to the grids 37 and 38, thus adjusting the triodes 20 and 26 to equal gain for the fundamental frequency.

In a similar manner, with zero multiplicand signal and with a multiplier signal of small amplitude applied to the primary of transformer 42 and with switch S set to position B connecting the opposed pairs V1 and V4 to opposite sides of the primary 24, the potentiometers 53 and 54C are next adjusted together to provide minimum output from the secondary of transformer 25. Shifting the adjustable arm of potentiometer 53 sets the operating points of the opposed triodes 21 and 29 so that the curvatures of the characteristics match and eliminates the spurious second harmonic signal. Shifting the adjustable arm 59 of potentiometer 54C varies the relative amplitudes of the multiplier signal applied in phase to the grids 45 and 46, thereby adjusting the opposed triodes 21 and 29 to equal gain for the fundamental input frequency.

With zero multiplicand signal and with a multiplier signal of small amplitude applied to the primary winding of transformer 42 and with the switch S set to position C connecting the pairs V2 and V3 through switch arms 49 and 48 respectively to opposite sides of the primary 24, the adjustable arms of the potentiometers 52 and 54D are then shifted to provide minimum output from the secondary of transformer 25 in exactly the same manner as described for the tube pairs V1—V2 and V1—V4.

Finally the switch S is set at position D to connect the anodes of tube pairs V1 and V3 through switch arms 47 and 48 respectively to one side of the primary winding 24 and the anodes of tube pairs V2 and V4 through switch arms 49 and 50 respectively to the opposite side of the primary 24. With zero multiplier signal and with a multiplicand signal of small amplitude applied to the primary winding of transformer 36, the adjustable arms 57 and 58 of the potentiometers 54A and 54B respectively are then adjusted together to provide minimum output from the secondary of transformer 25. In the final step, with zero multiplicand signal and with a multiplier signal of small amplitude applied to the primary of the transformer 42, the adjustable arms 59 and 60 of the potentiometers 54C and 54D respectively are adjusted together to provide minimum output from the secondary of the transformer 25.

While throughout the balancing operation the output of the secondary of transformer 25 may be read upon a meter, it is convenient to observe this output on an oscilloscope, which should be set to sweep at half the input frequency and synchronized to the input signal.

It has been found that even with tubes of widely variant characteristics, the response of the multiplier circuit is substantially linear over a wide range of input signals if the above described balancing procedure is followed. Even when tubes purposely selected because of their differing characteristics are utilized and this balancing procedure is followed, the response is as linear as when the tubes in the multiplier circuit are matched.

The linearity of the response of the multiplier circuit at low frequencies may sometimes be improved by a condenser 63 shown in dotted lines in Fig. 3 shunting the secondary winding of the output transformer 25.

Thus the invention comprises an improved multiplier circuit in which it is unnecessary to use matched vacuum tubes to obtain an output signal having instantaneous ordinates which are proportional to the product of the instantaneous ordinates of two applied A. C. signals.

Although the various embodiments have been illustrated and described as utilizing triodes, it is to be understood that the invention is not so limited and that other amplifying devices such as transistors or pentodes and other vacuum tubes are all within the scope of the invention.

Although the disclosed electronic multiplier accepts two inputs which are both of general A. C. form, it is also possible to utilize the circuit with a D. C. control signal. Of course, in such an application input transformers 36 and 42 are not required. A single-ended unidirectional signal may be applied across a resistance having one end at constant potential, e. g., ground, and coupled to the grid of one triode in each of two opposed pairs and the opposite end coupled to the grid of one triode of each of the remaining pairs. In other embodiments a D. C. control signal balanced to ground may be utilized.

I claim:

1. A symmetrical electronic analog multiplier for obtaining the product of a multiplicand signal and a multiplier signal comprising an output transformer having a primary winding, four similar amplifying devices each comprising an amplifier triode and a control triode having commoned anodes and commoned cathodes, each said triode having a control grid, each said device having an equal resistor connecting said commoned cathodes to ground, said commoned anodes of the first and third said devices being connected to one end of said primary winding, said commoned anodes of the second and fourth said devices being connected to said primary winding at the other end thereof, a source of anode potential connected to said primary winding at the midpoint thereof, input means for applying said multiplicand signal in push-pull to said grids of said amplifier triodes of said first and third devices and in push-pull to said grids of said amplifier triodes of said second and fourth devices, and input means for applying said multiplier signal in push-pull to said grids of said control triodes of said first and third devices and in push-pull but opposite phase to said grids of said control triodes of said second and fourth devices.

2. A symmetrical electronic analog multiplier for obtaining the product of a multiplicand signal and a multiplier signal comprising an output transformer having a primary winding, four similar pairs of triodes, each triode of each pair having an anode, a cathode and a control grid, said triodes of each pair having commoned anodes and commoned cathodes, equal unbypassed resistors connecting said commoned cathodes of the first and second pairs and said commoned cathodes of the third and fourth pairs, said commoned anodes of said first and third pairs being connected to said primary winding at one end thereof, said commoned anodes of said second and fourth pairs being connected to said primary winding at the other end thereof, a source of anode potential connected to said primary winding at the midpoint thereof, input means for applying said multiplicand signal in push-pull to said grid of one triode of each said first and third pairs and in push-pull to said grid of one triode of each said second and fourth pairs and input means for applying said multiplier signal in push-pull to said grid of the other triodes of each said first and third pairs and in push-pull but opposite phase to said grid of the other triode of each said second and fourth pairs.

3. A symmetrical electronic analog multiplier for obtaining the product of a multiplicand signal and a multiplier signal comprising an output transformer having a primary winding provided with a midpoint tap for connection to an anode potential source, two input transformers each having a secondary winding provided with a tap at the midpoint thereof for connection to ground, four similar pairs of triodes, each said triode having an anode, a cathode and a control grid, each said pair having commoned anodes and commoned cathodes, said commoned anodes of the first and third said pairs being connected to said primary winding at one end thereof, said commoned anodes of the second and fourth said pairs being connected to said primary winding at the other end thereof, said commoned cathodes of said each pair being connected to ground through equal cathode resistors, said grid of one triode of each said first and second pairs being connected to one end of said secondary winding of one said input transformer, said grid of one triode of each said third and fourth pairs being connected to the other end of said secondary winding of said one input transformer, said grid of the other triode of each said first and fourth pairs being connected to one end of said secondary winding of the other said input transformer and said grid of the other triode of each said second and third pairs being connected to the other end of said secondary winding of said other input transformer whereby the product of said multiplicand signal and said multiplier signal applied to said input transformers is obtained in said output transformer.

4. A symmetrical electronic analog multiplier in accordance with claim 3 and including means for balancing said multiplier to compensate for variations in the characteristics of said triodes, said balancing means comprising a potentiometer connected between said cathode resistor of said each pair and ground, and means for varying the amplitude of the signal applied to the control grid of one triode relative to the amplitude of the same signal applied to the control grid of the triode excited in phase therewith.

5. A symmetrical electronic analog multiplier in accordance with claim 3 and including means for balancing said multiplier to compensate for variations in the characteristics of said triodes, said balancing means comprising potentiometer means connected between said cathode resistor of said each pair and ground, potentiometer means connected between the control grids of the triodes receiving in-phase signals from said input transformers, and means for individually connecting to opposite ends of said primary winding of said output transformer the anodes of said first and second pairs, the anodes of said first and fourth pairs, and the anodes of said second and third pairs.

References Cited in the file of this patent

UNITED STATES PATENTS

| | | |
|---|---|---|
| 2,217,269 | Foster | Oct. 8, 1940 |
| 2,239,776 | Brunn | Apr. 29, 1941 |
| 2,399,586 | Toomin | Apr. 30, 1946 |
| 2,484,107 | Maron | Oct. 11, 1949 |
| 2,560,170 | Gray | July 10, 1951 |